United States Patent [19]

Kadaira

[11] Patent Number: 5,404,476
[45] Date of Patent: Apr. 4, 1995

[54] MULTIPROCESSING SYSTEM HAVING A SINGLE TRANSLATION LOOKASIDE BUFFER WITH REDUCED PROCESSOR OVERHEAD

[75] Inventor: Gizo Kadaira, Tokyo, Japan

[73] Assignee: NEC Corporation, Tokyo, Japan

[21] Appl. No.: 31,380

[22] Filed: Mar. 9, 1993

Related U.S. Application Data

[63] Continuation-in-part of Ser. No. 479,428, Feb. 12, 1990, abandoned.

[30] Foreign Application Priority Data

Feb. 10, 1989 [JP] Japan ................................. 1-32294

[51] Int. Cl.6 .................... G06F 12/08; G06F 12/14
[52] U.S. Cl. ..................................... 395/400; 395/425;
364/228; 364/228.1; 364/230; 364/243;
364/243.41; 364/243.4; 364/246; 364/246.3;
364/256.3; 364/256.4; 364/DIG. 1
[58] Field of Search ............................... 395/400, 425

[56] References Cited

U.S. PATENT DOCUMENTS

| | | | |
|---|---|---|---|
| 4,136,385 | 1/1979 | Gannon et al. | 395/400 |
| 4,376,297 | 3/1983 | Anderson et al. | 395/400 |
| 4,442,487 | 4/1984 | Fletcher et al. | 395/425 |
| 4,481,573 | 11/1984 | Fukunaga et al. | 395/400 |
| 4,484,267 | 11/1984 | Fletcher | 395/425 |
| 4,525,778 | 6/1985 | Cane | 395/400 |
| 4,682,281 | 7/1987 | Woffinden et al. | 395/400 |
| 4,775,955 | 10/1988 | Liu | 395/425 |
| 4,827,406 | 5/1989 | Bischoff et al. | 395/425 |
| 4,905,141 | 2/1990 | Brenza | 395/425 |
| 5,008,811 | 4/1991 | Scalzi et al. | 395/400 |

Primary Examiner—Jack B. Harvey
Assistant Examiner—Michael A. Whitfield
Attorney, Agent, or Firm—Foley & Lardner

[57] ABSTRACT

A requesting processor issues an instruction containing a segmented virtual space identifier (VSID) and a shared-access or nonshared-access identifier. A single translation lookaside buffer is divided into TLB partitions which have corresponding directory registers. Each directory register has a first field for storing a VSID and a second field have bit positions respectively assigned to the processors of the system. If the instruction contains a nonshared-access identifier, a directory controller selects one of the registers whose second field contains all vacant bit positions and writes the VSID of the instruction into the register and sets a bit in a position assigned to the requesting processor. The controller detects a register having the same VSID and first and second bits in positions respectively assigned to the master and requesting processors, and resets the second bit. If the instruction contains a shared-access identifier, then the directory controller detects a first register having the same VSID and a bit in a position assigned to the master processor and a second register having the same VSID and a bit in a position assigned to the requesting processor, sets a bit in a position of the first register assigned to the requesting processor, and resets the bit of the second register.

2 Claims, 5 Drawing Sheets

MULTIPROCESSING SYSTEM HAVING A SINGLE TRANSLATION LOOKASIDE BUFFER WITH REDUCED PROCESSOR OVERHEAD

This application is a Continuation-in-Part of application Ser. No. 07/479,428, filed Feb. 12, 1990, abandoned.

BACKGROUND OF THE INVENTION

The present invention relates generally to multiprocessor systems, and more specifically to address translation technique for multiprocessor systems.

Supercomputers are increasingly used for high-speed calculations in many scientific and industrial applications. To meet the high-speed requirement, multi-processing systems have been developed to process multiple jobs and tasks in a parallel mode. In many of such applications, the amount of data to be processed exceeds the capacity of the main memory of the system, and therefore, a technique known as "virtual memory" is usually employed for virtually expanding the storage area of main memory by creating an extended area in a mass storage system such as hard disks. With this technique, logical memory addresses in a program are translated to physical memory addresses on a per page basis using address translation tables stored in the main memory before it is accessed by each processor. To reduce the access time, a high-speed, translation lookaside buffer is provided, and each processor loads its identification number and a copy of the address table into the buffer. As a result, in a multitasking mode, processors load address translation tables into the buffer when they attempt to access the same pages and therefore processor overhead for address mapping increases. One solution to this problem would be the use of a technique by which all address translation tables that correspond to a segmented virtual space are simultaneously loaded as disclosed in U.S. Pat. No. 4,481,573. However, as discussed in this patent, there must be provided as many translation lookaside buffers as there are processors, resulting in an increase in hardware cost.

SUMMARY OF THE INVENTION

It is therefore an object of the present invention to provide a multiprocessor system having a single translation lookaside buffer while reducing processor overhead to allow it to be used efficiently by the processors.

According to a first aspect of the present invention, there is provided a multiprocessing system having a master processor and a plurality of slave processors and a main memory connected to the processors, the main memory having a plurality of paged address translation tables stored respectively in logical memory spaces, each of the tables describing a relationship between a logical address and a physical address. From a requesting processor, the system receives instructions containing a segmented virtual space identifier. A single translation lookaside buffer is provided which is divided into a plurality of TLB partitions. Directly registers are provided respectively corresponding to the TLB partitions, each of the registers being partitioned into a first field and a second field having bit positions respectively assigned to the processors. A directory controller is responsive to an instruction containing a nonshared-access identifier for selecting one of the directory registers whose second field contains all vacant bit positions, and writing the VSID into the first field of the selected register and a bit in a position assigned to the requesting processor. The directory controller makes a search through the registers to detect one having the VSID and first and second bits in positions which are respectively assigned to the master processor and the requesting processor, and resets the second bit. In response to an instruction containing a shared-access identifier, the directory controller makes a search through the registers to detect a first register having the same VSID and a bit in a position assigned to the master processor and a second register having the same VSID and a bit in a position assigned to the requesting processor, sets a bit in a position of the first register in a position assigned to the requesting processor, and resets a bit in a position of the second register assigned to the requesting processor. A table loading unit is responsive to the nonshared-access identifier for loading a copy of the paged address translation tables from the main memory into a TLB partition corresponding to a register having the same VSID and a single bit in the second field thereof, with the single bit being set in a position assigned to the requesting processor. A memory access controller accesses the main memory according to a physical address contained in a TLB partition corresponding to a register having the same VSID and a bit in a position assigned to the requesting processor.

BRIEF DESCRIPTION OF THE DRAWINGS

The present invention will be described in further detail with reference to the accompanying drawings, in which.

DETAILED DESCRIPTION OF THE PREFERRED EMBODIMENTS

Figure 1:
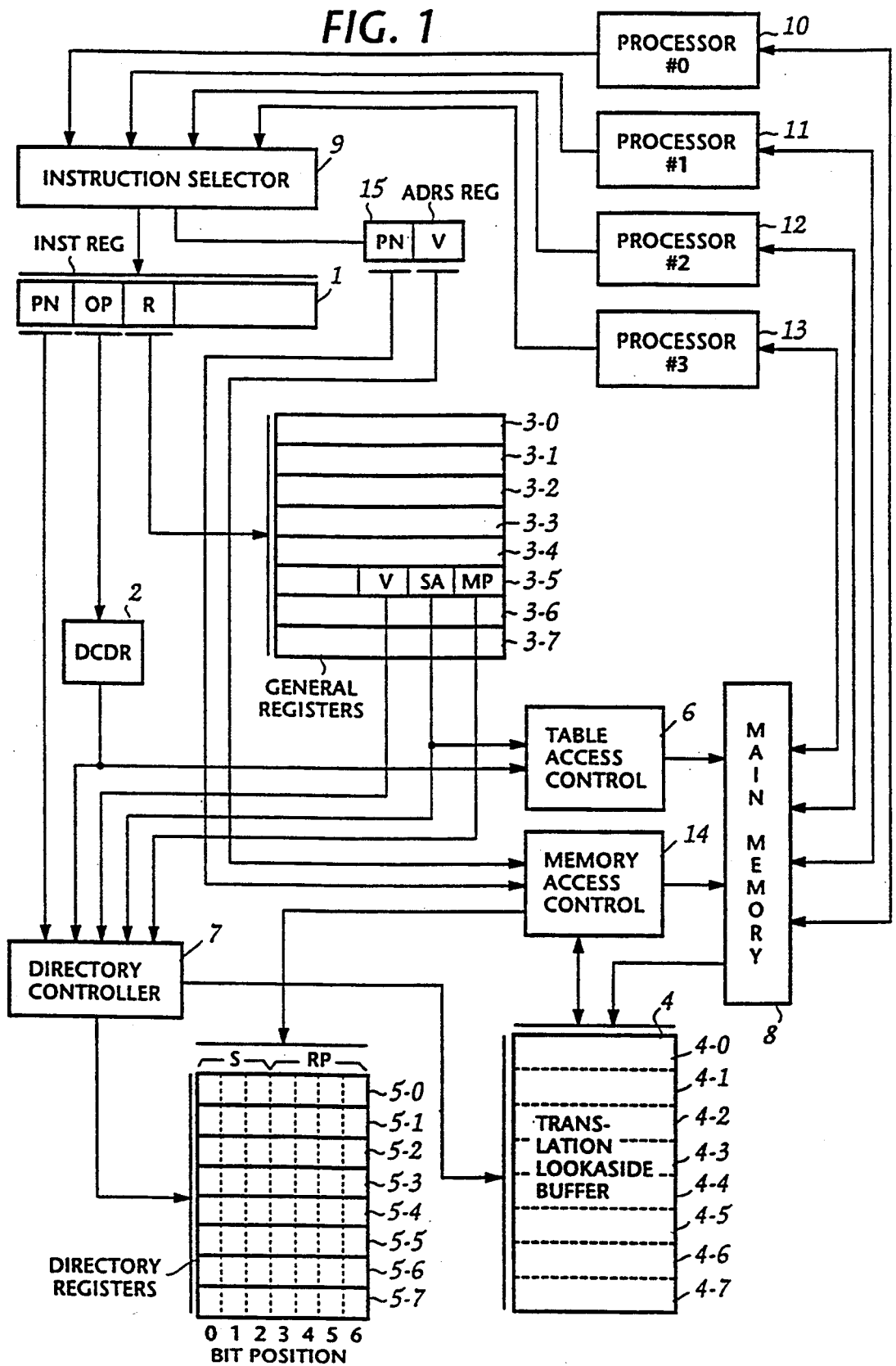
FIG. 1 is a block diagram of a multiprocessor system according to the present invention.

Referring now to FIG. 1, there is shown a multiprocessor system of the present invention. The system comprises an instruction register 1 for storing instructions loaded through one output terminal of instruction selector 9 from processors 10~13 having processor identifiers PN=00, PN=01, PN=10 and PN=11, respectively. Instruction register 1 contains a processor identifier field PN connected to a directory controller 7, an operation code field OP connected to a decoder 2, and a register identifier field R which specifies one of general registers 3-0~3-7. Each of the registers 3-0~3-7 includes a 3-bit segmented virtual space identifier, or VSID field V, a shared-access instruction field SA (the setting of bit "1" indicates that access is shared with processor 11 which is assumed to be a master processor), and a master processor identifier field MP. The fields V, SA and MP of general registers 3-0~3-7 are connected to directory controller 7.

If decoder 2 interprets an operation code from instruction register 1 as a "table load" instruction, it informs this fact to directory controller 7 and a table access controller 6 to which the fields SA of registers 3-0~3-7 are also applied.

Main memory 8 has a plurality of memory spaces each containing 16 pages of address translation tables. The entries of these memory spaces are sequentially addressed by the table access controller 6 to read out 16 address translation tables at a high speed.

According to this invention, only one translation lookaside buffer 4 is provided which is partitioned into eight buffer areas 4-0~4-7 each of which is identified by a 3-bit identifier for storing sixteen address translation tables read out of main memory 8 into each of the partitioned areas so that a total of 16×8=128 address translation tables are created in the translation lookaside buffer 4.

Directory registers 5-0~5-7, which are respectively associated with the buffer areas 4-0~4-7, are connected to directory controller 7. Each directory register is a 7-bit register having a 3-bit stored virtual space identifier field S which occupies #0 to #2 bit positions and a 4-bit registered processor identifier field RP occupying #3 to #6 bit positions. The S field of each directory register 5 is used to store the 3-bit identifier of a segmented virtual space identifier, and the #3 to #6 bit positions of the directory register are respectively assigned to processors #0 to #3. The setting of a bit "1" in one of bit positions #3 to #6 of a directory register indicates that the processor assigned to that bit position is allowed to access the translation tables stored in one of the buffer areas 4-0~4-7 which corresponds to the same directory register. Therefore, if a bit "1" is set in position #5 of register 5-6, processor #2 is allowed to access translation tables stored in buffer area 4-6.

Directory controller 7 provides write and search control on directory registers 5-0~5-7 in response to a signal from decoder 2. As will be described later, in response to a table load instruction, directory controller 7 selects one of registers 5 having all zeros in bit positions #3 to #6 and having a lowest register number among those having all zeros in the bit positions #3 to #6, and proceeds to read data out of general registers 3 into the S and RP fields of the selected directory register. During a shared-access mode invoked by a given slave processor (one of processors #0, #2 and #3), directory controller 7 searches all the S fields of directory registers 5-0~5-7 using the V and PN field data to detect those whose data matches the V field data and proceeds to detect one whose RP field matches the PN data so that only one directory register remains in the screening process. The bit "1" of the RP field of this directory register (which has been set during the time prior to the shared-access mode) is then reset to zero. Directory controller 7 makes a further search through all directory registers 5 using the V and MP field data to set a bit "1" into the RP field of the detected register in a position that is assigned to the given processor. During a subsequent exclusive-access mode requested by that given processor, directory controller 7 searches all directory registers 5 using the V, MP and PN data in succession to detect only one directory register and resets the bit "1" of the RP field of the detected register stored in the position assigned to the given processor.

Figure 2:
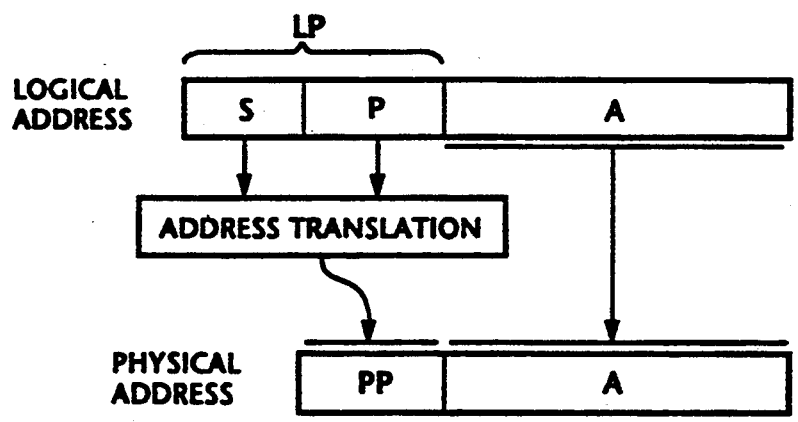
FIG. 2 illustrates the relationship between a logical address and a physical address.

The system further includes a memory access controller 14 and an address register 15 which is connected to a second output terminal of instruction selector 9 to receive a VSID code and a page number from a processor executing a program. Memory access controller 14 receives data from the PN field of instruction register 1 and the V field of general registers 3 and uses them as sought-for items to search the directory registers 5 to detect a register 5-i having the same VSID and a bit "1" in the RP field which is stored in a position assigned to the currently executing processor to determine if that processor is granted access. If granted, it proceeds to address the buffer area 4-i which corresponds to directory register 5-i. As shown in FIG. 2, the logical memory address contained in each of 16 address translation pages comprises a logical page field LP and an in-page address field A, the logical page field LP comprising a 3-bit VSID field S and a page identifier field P. The S and P field data are translated to a physical memory address with the address data of field A. Memory access controller 14 searches all pages using the VSID code and the page number received from address register 15. A corresponding physical page number PP is combined with the associated in-page address A to form a physical address which is returned to memory access controller 14 to read data from main memory 8 for loading into the processor of interest.

Figure 3:
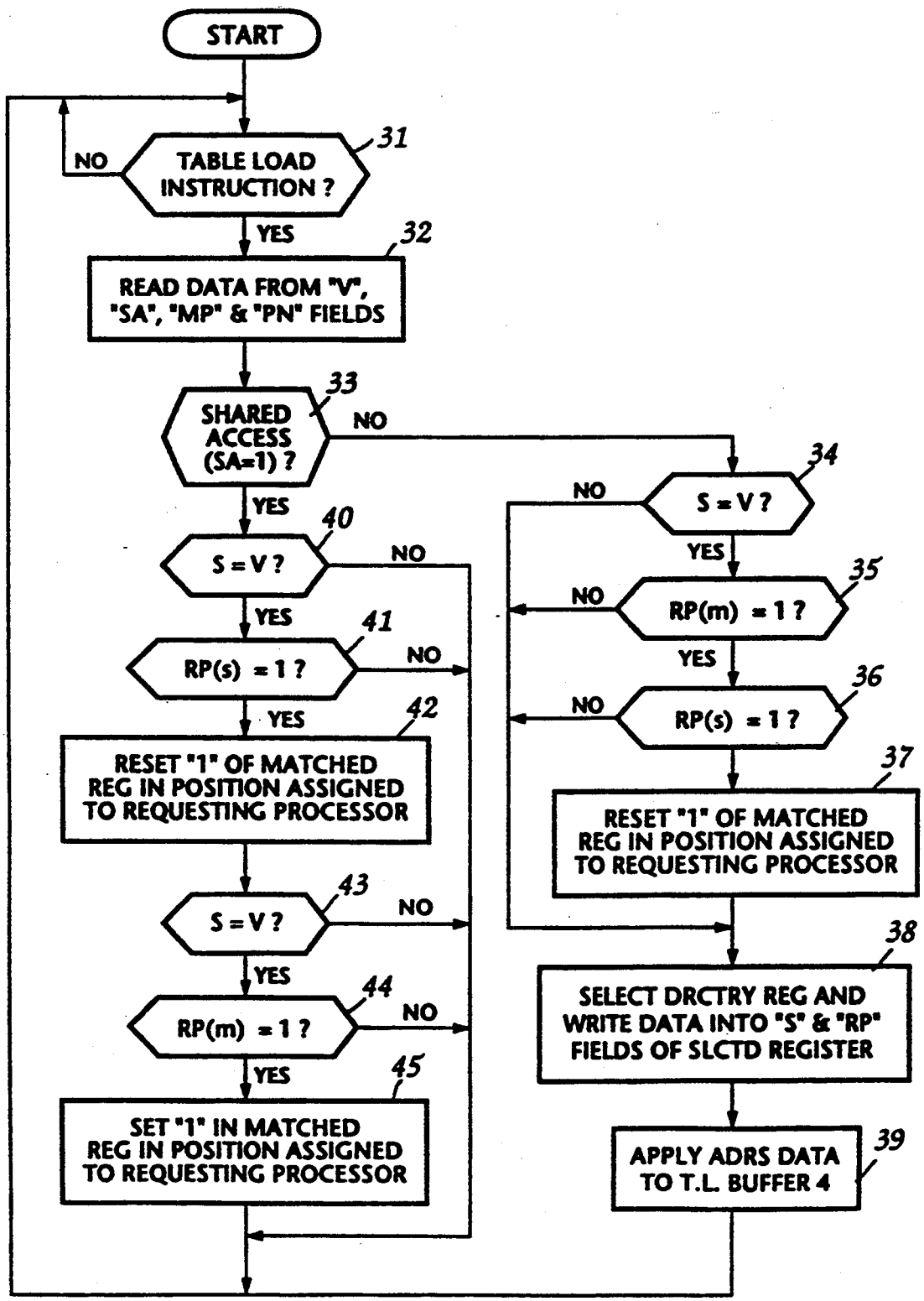
FIG. 3 is a flowchart describing a sequence of instructions executed by the directory controller of FIG. 1.

Details of the operation of directory controller 7 are shown in a flowchart of FIG. 3. Directory controller 7 starts with step 31 by checking to see if there is a table load instruction from decoder 2. If there is one, control exits to step 32 for the directory controller 7 to read the contents of the V, SA and MP fields of a general register 3 which is selected according to the R and PN fields of instruction register 1. Exit then is to step 33 for the directory controller 7 to check if SA=1 or SA=0, namely, whether the processor is attempting a shared-access to a common resource or an exclusive access to a given resource. If the answer is negative, control executes decision steps 34 to 37 by the directory controller 7 to make a search through all directory registers 5-0~5-7 using the data obtained from the V, MP and PN fields as sought-for items. Specifically, in step 34 the director controller 7 checks to see if there is one or more directory registers in which the data in their S field is equal to the contents of the received V field. If the answer is affirmative, control exits to step 35 for the directory controller 7 to detect if the RP field of the matched registers has a bit "1" in a position assigned to a master processor identified by the MP field. If the answer is affirmative, control advances to step 36 for the directory controller 7 to detect if the RP field of the registers which are matched in step 26 still has a bit "1" in a position assigned to the requesting processor identified by the PN field. If the answer is affirmative, control branches at step 36 to step 37 for the directory controller 7 to reset the bit "1" stored in that position. The resetting of this bit "1" indicates the denial of the right of a slave processor to access the common resource. Details of this resetting operation will be described later.

Figure 4:
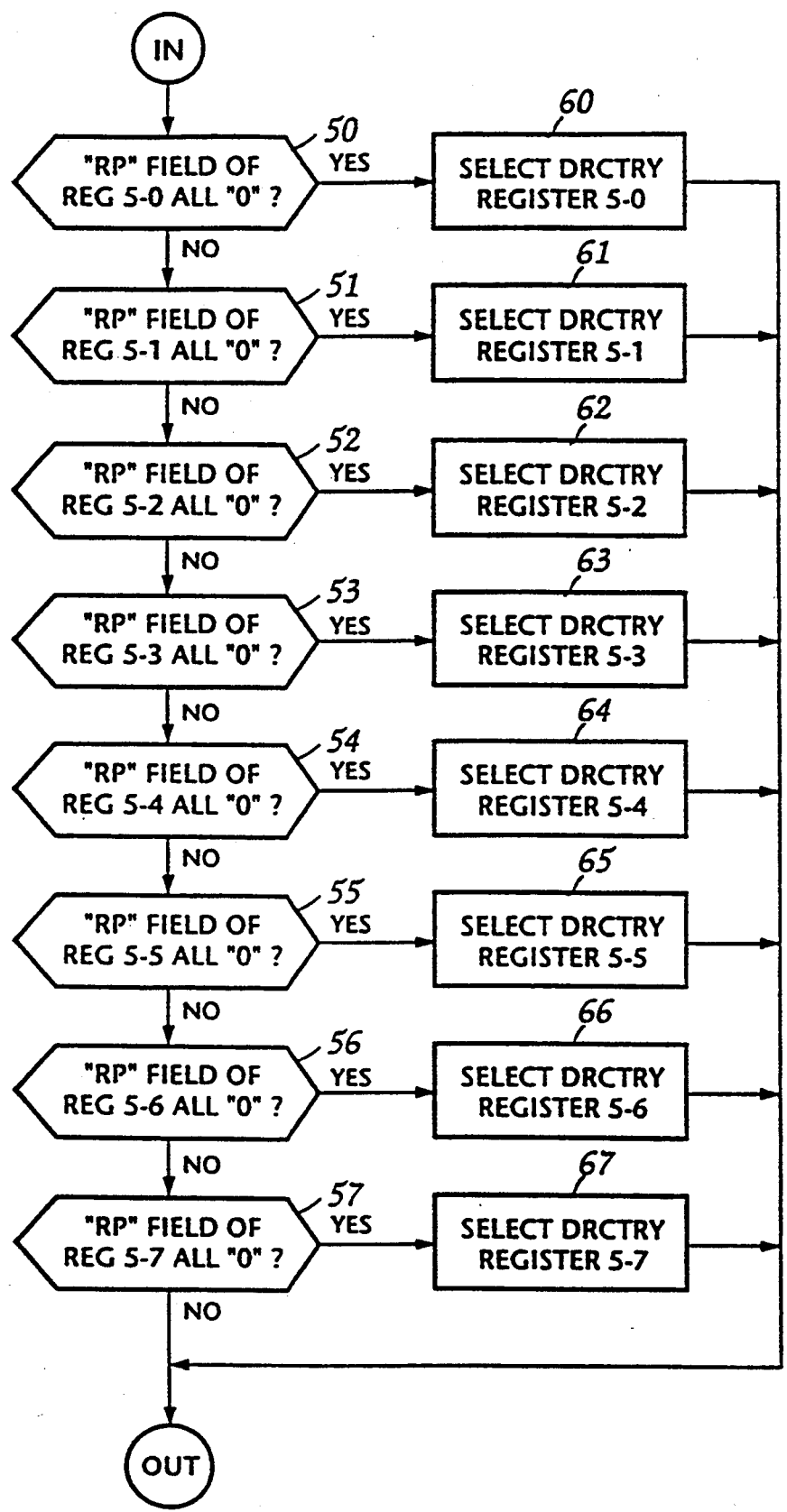
FIG. 4 is a flowchart describing details of the register selection step of FIG. 3.

The execution of step 37 or negative decision in any of steps 34, 35 and 36 is followed by step 38 for the directory controller 7 selecting one of directory registers 5-0~5-7 and writing the V field data read out of a general register into the S field of the selected directory register and a bit "1" into a position of the RP field of the selected register that is assigned to the requesting processor. Referring briefly to FIG. 4, the selection of a directory register by step 38 is done by the directory controller 7 sequentially executing decision steps 50 through 57. In each of these decision steps, the directory controller 7 sequentially examines the RP field of directory registers 5-0~5-7 to determine if it contains all zero's, starting with the directory register having the lowest register number, i.e., register 5-0, and if affirmative decision is made, control exits from one of decision steps 50~57 to a corresponding one of operations steps 60~67 to be performed by the directory controller 7. Therefore, if the decision in step 50 is negative, exit is to decision step 51, and if affirmative, exit is to step 60 in which the directory controller 7 selects the directory register 5-0. In like manner, if the decision in step 51 is negative, control exits to decision step 52, and if affirmative, step 61 is executed by the directory controller 7 selecting the directory register 5-1, and so forth. Returning to FIG. 3, control advances to step 39 for the directory controller 7 to apply address data to the translation lookaside buffer 4. Simultaneously, table access controller 6 receives data from a general register 3 and decoder 3 to address a buffer area that corresponds to the directory register which has been selected by step 38 or corresponds to the register whose bit "1" in the RP field has just been reset by step 37. Address translation tables stored in main memory 8 are addressed in a manner described below with reference to FIG. 5.

Figure 5:
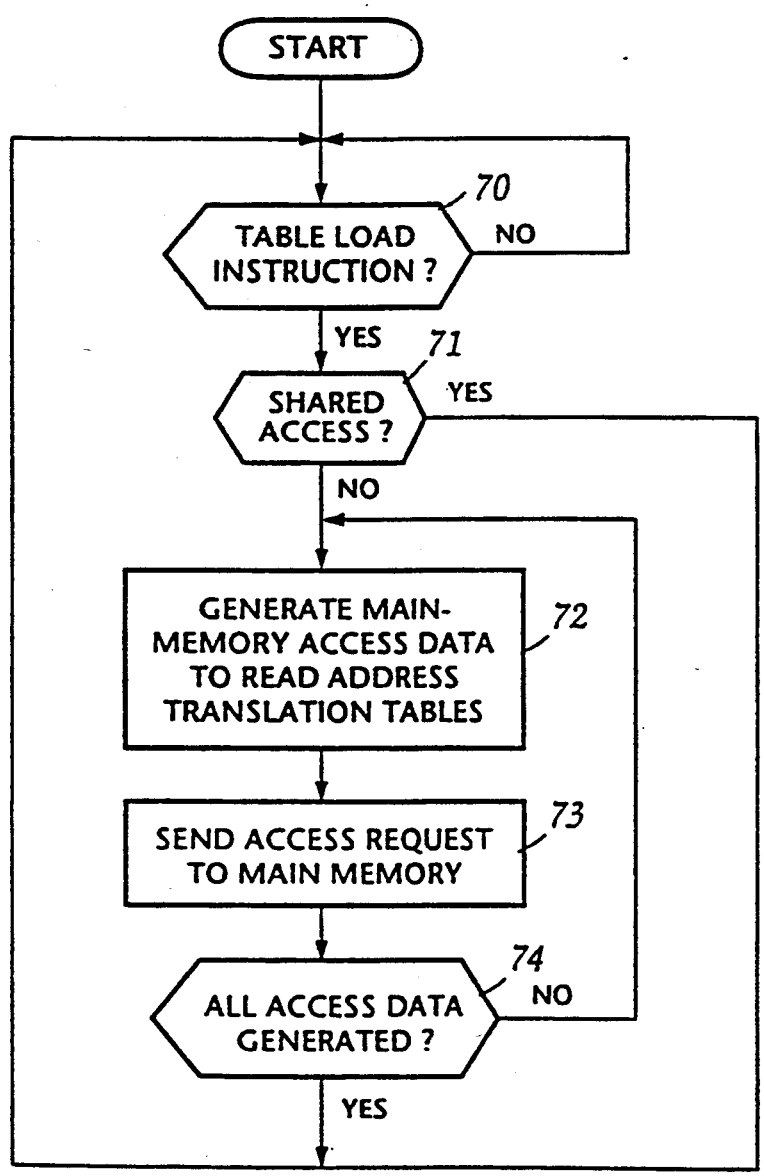
FIG. 5 is a flowchart describing a sequence of instructions executed by the table access controller of FIG. 1.

In FIG. 5, when a table load instruction is received from decoder 2 (step 70), table access controller 6 goes to step 71 to check to see if the content of the SA field from one of registers 3 is "1" or "0". If SA=1, control returns to step 70, otherwise exit is to step 72 for the table access controller 6 to generate main memory access data. Control proceeds to send an access request to main memory 8 (step 73) by the table access controller 6 and checks in step 74 to see if all access data are generated. If not, control returns to step 72 to repeat the process, so that all address data necessary to read 16 pages of a desired memory space are supplied to main memory 8. A copy of accessed pages is then loaded into one of the memory spaces 4-0~4-7 of buffer 4 and is addressed by the address data supplied from directory controller 7.

If the requesting processor is attempting a shared access, the answer in step 33 in FIG. 3 will be affirmative, and control moves to step 40 for the directory controller 7 to search all directory registers 5 using V and PN fields as sought-for items to detect one or more registers whose S field matches the V field. If the answer is affirmative, control moves to step 41 for the directory controller 7 to check to see if the RP field of the matched registers contains a bit "1" in a position which is assigned to the requesting processor identified by the PN field. If the answer is affirmative, there is only one matched register which contains the data associated with the requesting processor, and control exits to step 42 for the directory controller 7 to reset the bit "1" of the matched register in a position assigned to the requesting processor. The resetting of the RP field of this register renders it ineffective.

Following the resetting of the matched register, control makes a second search through all directory registers 5 by executing step 43 by the directory controller 7, using this time the V and MP fields as sought-for items to detect one or more registers whose S field data matches the V field. If the answer is affirmative, control exits to step 44 for the directory controller 7 to check to see if the RP field of the matched registers contains a bit "1" in a position assigned to a master processor identified by the MP field. If the answer is affirmative, there is only one directory register remaining in the screening process and control advances to step 45 for the directory controller 7 to set a bit "1" being assigned to the requesting (slave) processor. The setting of a bit "1" in the slave processor position indicates that the requesting processor is granted the right to have a shared-access to a common resource. Negative decision in any of steps 40, 41, 43 or 44 performed by the directory controller 7 allows control to return to step 31 for the directory controller 7 to repeat the process.

Figure 6:
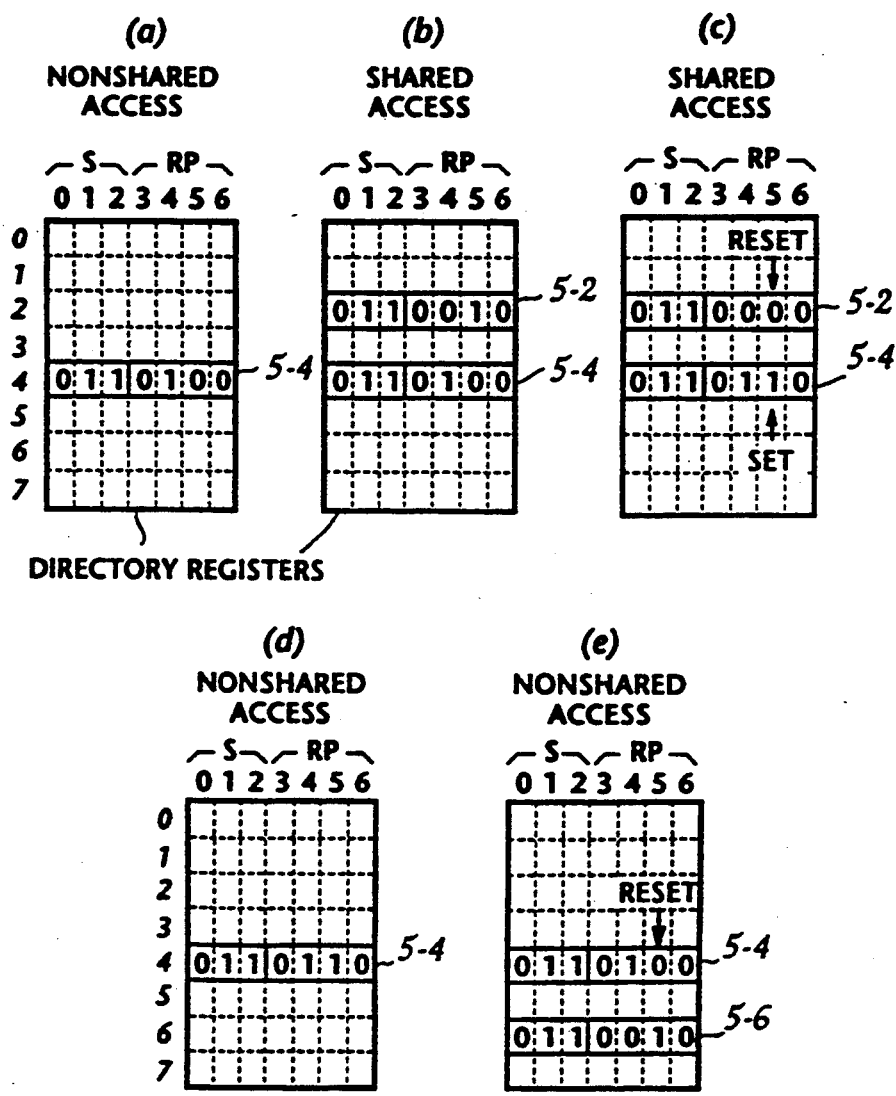
FIG. 6 illustrates the contents of directory registers.

For a full understanding of the present invention, the operation of the system will be given in more detail with reference to FIGS. 3 and 6 with the assumption that initially master processor #1 loads a copy of 16 pages of address translation tables into buffer area 4-4 and is executing a program, using directory register 5-4. Subsequently slave processor #2 attempts a shared-access to that buffer area by selecting directory register 5-2, and following this shared-access mode, processor #2 attempts an exclusive access to that buffer area using directory register 5-6.

When master processor #1 initially placed a table load instruction (nonshared access), control moves through steps 31 through 33, performed by the directory controller 7, and enters step 34. Since there is a match between the V field read from the general register 3-0 and the S field of register 5-4, control exits to step 35, to be performed by the directory controller. Again, the RP field of register 5-4 has a bit "1" in the master-processing position, and control exits to step 36, to be performed by the directory controller 7. Since there is not a bit "1" in a position other than that master processor position, the answer is negative in step 36 and control exits to the register selection step 38 for the directory controller 7 to select directory register 5-4 in a manner as described above with reference to FIG. 4 and writes "011" into the S field of register 5-4 and "0100" into the RP field of the register as shown in part (a) of FIG. 6. Control enters step 33 for the directory controller 7 to read data from the V=011, SA=0 and MP=01 fields of general register 3-0 which is selected by instruction register 1, for example, as well as data in the PN field of instruction register 1. Control then advances to step 39 for the directory controller 7 to apply address data to translation lookaside buffer 4 so that buffer area 4-4 is addressed and a copy of 16 pages of translation tables is loaded from main memory 8 into the addressed buffer area in a manner as described above with reference to FIG. 5 under control of table access controller 6. Using address translation data stored in translation lookaside buffer 4, master processor #1 is able to execute a program.

When a slave processor #2 subsequently issues a table load instruction (shared-access), control moves through steps 31 through 33 as performed by the directory controller 7 and enters step 40 to make a search through the S fields of all directory registers. Assume that processor #2 has previously accessed in an exclusive mode to a resource to which the master processor accessed, using directory register 5-2 as shown in (b) of FIG. 6. The directory controller 7 detects that directory registers 5-2 and 5-4 have the same contents in their S fields and control proceeds, to step 41 to check their RP fields with the PN=10 data so that directory register 5-2 remains in the screening process, and in step 42 the directory controller 7 resets the bit "1" in bit position #5 in bit position #5 of directory register 5-2 and control proceeds to step 43 (part (c) of FIG. 6). The directory controller 7 again detects registers 5-2 and 5-4 as having the same S field data, and control proceeds to step 44 for the directory controller 7 to check their RP fields with MP=01 so that register 5-4 remains in the screening process. Control moves to step 45 for the directory controller 7 to set a bit "1" in position #5 of directory register 5-4 (part (c) of FIG. 6). As a result, processors #1 and #2 are granted a shared-access to a resource identified by the segmented virtual space identifier "011".

At the end of the shared-access mode, slave processor #2 issues an exclusive-access table load instruction to instruction register 1 in order to execute a program in an exclusive access mode by loading V=011, SA-0 and MP=01 into general register 3-1. Control moves through steps 31 and 32, performed by the directory controller 7, and executes step 33. Using V=011, PN=10, MP=01, the directory controller 7 in step 33 searches all directory registers, so that registers 5-4 and 5-6 are detected as having the same S field and proceeds to step 35 to check to see if their RP field contains a bit "1" in the master-processing position. Since register 5-4 has a bit "1" in position #4, a match is detected, and control goes to step 36. In step 36, the directory controller 7 checks to see if directory register 5-4 has a bit "1" in a position assigned to processor #2, i.e., position #5. Since the answer is affirmative, control branches to step 37 for the directory controller 7 to reset the bit "1" in the #5 position which is assigned to requesting processor #2 (see part (e) of FIG. 6). Step 39 is then executed by the directory controller 7 to apply address data to buffer 4, allowing table access controller 6 to load a copy of 16 tables into buffer area 4-4 (part (f) of FIG. 6). The status of registers 5-4 and 5-6 indicates that processors #1 and #2 are allowed to individually access to the resource identified by segmented virtual space identifier "011".

Since only one translation lookaside buffer is required for the multiprocessing system of the present invention, the hardware cost can be kept to a minimum. In addition, the directory registers 5 are so configured that the identifiers of processors sharing a common resource are registered in the form of a bit "1" in a processor-assigned position of a directory register corresponding to the buffer area in which a copy of pages is loaded. This configuration substantially reduces the processor overhead which would otherwise occur when loading the address translation lookaside buffer to be efficiently utilized by the processors.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multiprocessing system having a plurality of processors, one of which is a master processor and the other processors are slave processors, and a main memory connected to said plurality of processors, said main memory having a plurality of paged address translation tables stored respectively in logical memory spaces, each of said tables describing a relationship between a logical address and a physical address, said multiprocessing system comprising:

means for receiving an instruction from a requesting processor, said instruction containing a segmented virtual space identifier (VSID) and a shared-access identifier or a nonshared-access identifier;

a translation lookaside buffer (TLB) divided into TLB partitions;

a plurality of registers respectively corresponding to said TLB partitions, each of said registers having first and second fields, said second field having bit positions respectively assigned to said plurality of processors;

means, responsive to an instruction received by said receiving means containing a nonshared-access identifier, for selecting one of said registers, said second field of said selected register having all vacant bit positions, and writing said VSID into said first field of said selected register and setting a bit in a bit position of said selected register assigned to said requesting processor, making a search through said registers to detect a register having said VSID and first and second bits in positions respectively assigned to said master processor and said requesting processor, and resetting said second bit;

means responsive to an instruction received by said receiving means containing a shared-access identifier, for making a search through said registers for detecting a first register having said VSID and a bit in a position assigned to said master processor, setting a bit in a position of said first register assigned to said requesting processor, and detecting a second register having said VSID and a bit in a position assigned to said requesting processor, and resetting said bit of said second register;

table loading means, responsive to said nonshared-access identifier, for loading a copy of said paged address translation tables from said main memory into a TLB partition corresponding to a register having said VSID and a single bit in said second field thereof, said single bit being set in a position assigned to said requesting processor; and memory access means for accessing said main memory according to a physical address contained in a TLB partition corresponding to a register having said VSID and a bit in a position assigned to said requesting processor.

2. In a multiprocessing system including a plurality of processors, one of which is a master processor and the other processors are slave processors, a main memory connected to said plurality of processors, said main memory having a plurality of paged address translation tables stored respectively in logical memory spaces, each of said tables describing a relationship between a logical address and a physical address, a single translation lookaside buffer (TLB) divided into a plurality of TLB partitions, a plurality of registers respectively corresponding to said TLB partitions, each of said registers including first and second fields, said second field having bit positions respectively assigned to said plurality of processors, a method comprising the steps of:

a. receiving from a requesting processor an instruction containing a segmented virtual space identifier (VSID) and a shared-access identifier or a nonshared-access identifier;

b. if said instruction contains a nonshared-access identifier, (1) selecting a register whose said second field contains all vacant bit positions and writing said VSID into said first field of said selected register and a bit in one of said vacant bit positions which is assigned to said requesting processor, (2) loading a copy of said paged address translation tables from said main memory into a TLB partition corresponding to a register containing said VSID and a single bit in said second field thereof, said single bit being set in a position assigned to said requesting processor, and (3) detecting a register having said VSID and first and second bits in positions assigned respectively to said master processor and said requesting processor and resetting said second bit;

c. if said instruction contains a shared-access identifier, detecting first and second registers, said first register having said VSID and a bit in a position assigned to said master processor and said second register having said VSID and a bit in a position assigned to said requesting processor, setting a bit in a position of said first register assigned to said requesting processor, and resetting said bit of said second register; and d. accessing said main memory according to a physical address contained in a TLB partition corresponding to a register containing said VSID and a bit in a position assigned to said requesting processor.

* * * * *